(12) United States Patent
Mittal et al.

(10) Patent No.: US 12,299,082 B2
(45) Date of Patent: *May 13, 2025

(54) IMAGE GENERATION USING ADVERSARIAL ATTACKS FOR IMBALANCED DATASETS

(71) Applicant: MICROSOFT TECHNOLOGY LICENSING, LLC, Redmond, WA (US)

(72) Inventors: Gaurav Mittal, Redmond, WA (US); Nikolaos Karianakis, Sammamish, WA (US); Victor Manuel Fragoso Rojas, Bellevue, WA (US); Mei Chen, Redmond, WA (US); Jedrzej Jakub Kozerawski, Goleta, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,029

(22) Filed: Mar. 7, 2024

(65) Prior Publication Data

US 2024/0211547 A1 Jun. 27, 2024

Related U.S. Application Data

(63) Continuation of application No. 17/361,146, filed on Jun. 28, 2021, now Pat. No. 11,960,574.

(51) Int. Cl.
*G06F 18/2431* (2023.01)
*G06N 3/04* (2023.01)
*G06N 3/08* (2023.01)

(52) U.S. Cl.
CPC .......... *G06F 18/2431* (2023.01); *G06N 3/04* (2013.01); *G06N 3/08* (2013.01)

(58) Field of Classification Search
CPC .... G06F 18/2431; G06N 3/04; G06N 3/0464; G06N 3/08; G06N 3/084; G06N 3/094; G06N 3/096; G06V 10/774; G06V 10/82
See application file for complete search history.

(56) References Cited

U.S. PATENT DOCUMENTS

| 2013/0077979 A1* | 3/2013 | Dou | H04B 10/2543 |
| | | | 398/192 |
| 2013/0188948 A1* | 7/2013 | Dou | H04B 10/2543 |
| | | | 398/28 |

(Continued)

OTHER PUBLICATIONS

Ziwei Liu, "Large-Scale Long-Tailed Recognition in an Open World," Jun. 2019, Proceedings of the IEEE/CVF Conference on Computer Vision and Pattern Recognition (CVPR), 2019,pp. 2537-2540.*

(Continued)

*Primary Examiner* — Omar S Ismail
(74) *Attorney, Agent, or Firm* — Han Gim; Newport IP, LLC

(57) ABSTRACT

A method of balancing a dataset for a machine learning model includes identifying confusing classes of few-shot classes for a machine learning model during validation. One of the confusing classes and an image from one of the few-shot classes are selected. An image perturbation is computed such that the selected image is classified as the selected confusing class. The selected image is modified with the computed perturbation. The modified selected image is added to a batch for training the machine learning model.

20 Claims, 8 Drawing Sheets

(56) References Cited

U.S. PATENT DOCUMENTS

| | | | | |
|---|---|---|---|---|
| 2018/0247107 | A1* | 8/2018 | Murthy | G06V 20/698 |
| 2019/0130188 | A1* | 5/2019 | Zhou | G06T 7/248 |
| 2020/0380118 | A1* | 12/2020 | Miller | G06N 3/045 |
| 2020/0387608 | A1* | 12/2020 | Miller | G06N 3/04 |
| 2020/0410228 | A1* | 12/2020 | Wang | G06N 3/04 |
| 2021/0117948 | A1* | 4/2021 | Voss | G06Q 20/322 |
| 2021/0174497 | A1* | 6/2021 | Yoo | G06F 18/24 |

OTHER PUBLICATIONS

Qi Dong,"Imbalanced Deep Learning by Minority Class Incremental Rectification," May 14, 2019,IEEE Transactions on Pattern Analysis and Machine Intelligence, vol. 41,No. 6, Jun. 2019, Paragraphs 1367-1371.*

Wang, et al., "Low-shot learning from imaginary data", In Proceedings of the IEEE Conference on Computer Vision and Pattern Recognition, Jun. 18, 2018, pp. 7278-7286.*

Razavi, et al., "Generating Diverse High-Fidelity Images with VQ-VAE-2", Jun. 2, 2019, In Repository of arXiv:1906.00446v1, Jun. 2, 2019, pp. 1-10.*

Nguyen, et al., "Deep neural networks are easily fooled: High confidence predictions for unrecognizable images",Jun. 7, 2015, In Proceedings of IEEE Conference on Computer Vision and Pattern Recognition, pp. 427-436.*

Seong Joon Oh et al., "Adversarial Image Perturbation for Privacy Protection A Game Theory Perspective",Dec. 25, 2017, 2017 IEEE International Conference on Computer Vision, pp. 1491-1496.*

F. Marra et al., "On the vulnerability of deep learning to adversarial attacks for camera model identification",Dec. 25, 2017, Signal Processing: Image Communication 65 (2018),pp. 240-246.*

Naveed Akhtar et al.,"Threat of Adversarial Attacks on Deep Learning in Computer Vision: A Survey," Mar. 28, 2018,IEEE Access, vol. 6,2018, pp. 14410-14425.*

Emilio Rafael Balda et al., "Perturbation Analysis of Learning Algorithms: Generation of Adversarial Examples From Classification to Regression", Sep. 23, 2019, IEEE Transactions on Signal Processing, vol. 67, No. 23, Dec. 1, 2019,pp. 6078-6088.*

Omid Poursaeed et al.,"Generative Adversarial Perturbations," Jun. 2018, Proceedings of the IEEE Conference on Computer Vision and Pattern Recognition (CVPR), 2018,pp. 4422-4428.*

Dong, et al., "Imbalanced Deep Learning by Minority Class Incremental Rectification", IEEE Transactions on pattern analysis and machine intelligence, vol. 41, No. 6, Jun. 2019, pp. 1367-1381.

Liu, et al., "Large-Scale Long-Tailed Recognition in an Open World," In Proceedings of IEEE/CVF Conference on Computer Vision and Pattern Recognition, 2019, pp. 2537-2546.

Nguyen, et al., "Deep neural networks are easily fooled: High confidence predictions for unrecognizable Images," In Proceedings of IEEE Conference on Computer Vision and Pattern Recognition, 2015, pp. 427-436.

Notice of Allowance mailed on Dec. 13, 2023, in U.S. Appl. No. 17/361,146, 12 pages.

Razavi, et al., "Generating Diverse High-Fidelity Images with VQ-VAE-2," In Journal of Advances in neural information processing systems, vol. 32, 2019, 11 Pages.

* cited by examiner (a) Long-tailed datasets

IMAGE GENERATION USING ADVERSARIAL ATTACKS FOR IMBALANCED DATASETS

CROSS-REFERENCE TO RELATED APPLICATION

This application is a continuation of U.S. patent application Ser. No. 17/361,146, filed Jun. 28, 2021, the contents of which are expressly incorporated herein by reference in their entirety.

BACKGROUND

Machine learning is increasingly being utilized to perform a variety of tasks in various environments where patterns and inferences may be used in place of explicit programming. Training deep learning models using imbalanced datasets (i.e., datasets in which some classes have more training images than other classes) may produce models that are biased towards classes that have more images in the dataset. This bias allows the model work to well for classes that have substantial training images but decreases the performance of classes with only a handful of training images.

It is with respect to these considerations and others that the disclosure made herein is presented.

SUMMARY

Methods and systems are disclosed for generating images for few-shot classes, or classes with a small number of training images in an imbalanced dataset. To compensate for the lack of training data for few-shot classes, the disclosed embodiments provide a way to generate additional images for few-shot classes. While existing methods can attempt to generate additional images for few-shot classes, the existing methods use complex or elaborate additional networks, such as, GANs and VAEs, to produce images for few-shot classes. Thus, existing methods are difficult to use since they require additional losses, demand significant training times (e.g., weeks of GPU training time), and require more computational resources. The disclosed embodiments may reduce necessary computational resources, training times, and avoid the use of additional networks for generating extra training images for few-shot classes. The disclosed embodiments only require the use of the underlying training deep neural network to operate.

In various embodiments, the disclosed image generation process may include:
1. Identify the confusing classes of the few-shot classes from the validation step;
2. Select one confusing class from step 1;
3. Select an image from a few-shot class;
4. Compute an image perturbation such that the selected image from step 3 is classified as the confusing class chosen in step 2; and
5. Modify the selected image in step 3 with the computed perturbation from step 4 and add the modified image to the batch for training.

To compute the perturbation mentioned in step 4, a gradient-ascent-based technique may be used that propagates the gradient to the input image of the neural network. The method thus computes a pixel update from this process. Given that the disclosed method uses simple gradient-ascent-based techniques over the underlying training model, it avoids the use of complicated losses for GANs or VAEs and consequently does not require an elaborate training method.

While many of the examples described herein use natural long tail data set and an optimizer, the disclosed embodiments can be implemented by any type of artificial data set and any gradient ascent optimizer.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

Figure 1:
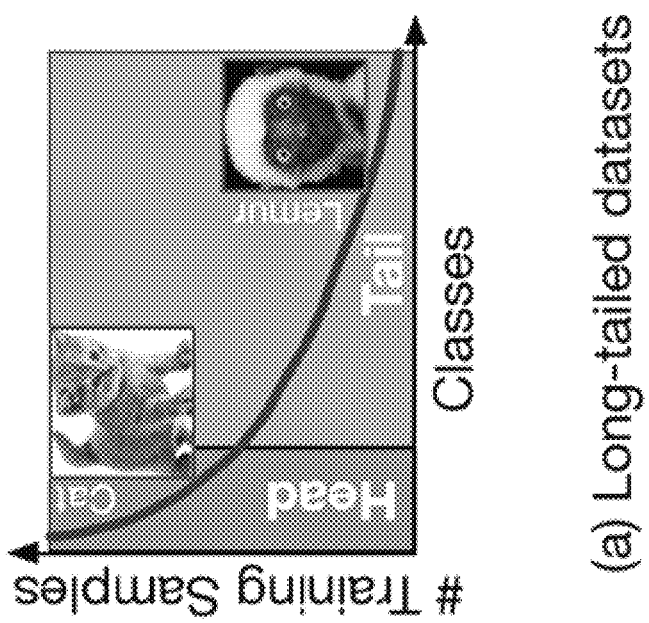
FIG. 1 is a diagram illustrating the disclosed techniques according to one embodiment disclosed herein.

Referring to the appended drawings, in which like numerals represent like elements throughout the several FIGURES, aspects of various technologies for detecting unauthorized certificates will be described. In the following detailed description, references are made to the accompanying drawings that form a part hereof, and which are shown by way of illustration specific configurations or examples.

Real visual-world datasets tend to have few classes with large numbers of samples (i.e., head classes) and many others with smaller numbers of samples (i.e., tail classes). However, this imbalance enables a visual recognition system to perform well on head classes but poorly on tail classes. Training deep learning models using imbalanced datasets (i.e., datasets in which some classes have more training images than other classes) can produce models that are biased towards classes that have more images in the dataset. This bias makes the model work well for classes that have substantial training images but decreases the performance of classes with only a handful of training images.

The present disclosure provides a way to generate images for few-shot classes, classes with a small number of training images in an imbalanced dataset. To compensate for the lack of training data for few-shot classes, the disclosure includes a method that generates additional images for few-shot classes and improves the generalization performance of a classifier. While generation of additional images has been a common line of attack, existing methods typically use complex or elaborate additional networks, such as, GANs and VAEs, to produce images for few-shot classes. Thus, existing methods are difficult and costly to use since they require additional losses, demand significant training times (e.g., weeks of GPU training time), and require more computational resources.

The present disclosure instead aims to minimize necessary computational resources, training times, and avoids the use of additional networks for generating extra training images for few-shot classes. The disclosed embodiments use the underlying training deep neural network to operate, uses a gradient-ascent-based image generation algorithm that requires significantly less training time and computational resources, and avoids the use of dedicated generative networks, which adds significant computational overhead and require elaborate training procedures.

In sum, the disclosed image generation process works as follows:
1. Identify the confusing classes of the few-shot classes from the validation step;
2. Select one confusing class from step 1;
3. Select an image from a few-shot class;
4. Compute an image perturbation such that the selected image from step 3 is classified as the confusing class chosen in step 2; and
5. Modify the selected image in step 3 with the computed perturbation from step 4 and add the modified image to the batch for training.

To compute the perturbation mentioned in step 4, a gradient-ascent-based technique is used that propagates the gradient to the input image of the neural network. The disclosed embodiments thus compute a pixel update from this process. Given that the disclosed embodiments use simple gradient-ascent-based techniques over the underlying training model, it avoids the use of complicated losses for GANs or VAEs and consequently does not need an elaborate training method.

Visual recognition systems deliver impressive performance due to the vast publicly available amount of data and convolutional neural networks (CNN). Despite these advancements, the majority of the state-of-the-art visual recognition systems learn from artificially balanced large-scale datasets. These datasets are not representative of the data distribution in most real-world applications. The statistics of the real visual world follow a long-tailed distribution. These distributions have a handful of classes with a large number of training instances (head classes) and many classes with only a few training samples (tail classes). FIG. 1 illustrates a long-tailed dataset. Real-world datasets are often naturally imbalanced as they present a long-tail distribution over classes. Some classes (e.g., cats) have an abundant number of training instances (head classes) while others (e.g., lemurs) have fewer training examples (tail classes).

The main motivation for visual recognition is to understand and learn from the real visual world. While the state of the art can challenge human performance on academic datasets, the state of the art is missing an efficient mechanism for learning tail classes. Training models using long-tailed datasets often lead to unsatisfying tail performance. This is because the imbalance in real-world datasets imposes a bias that enables a visual recognition system to perform well on head classes but often poorly on tail classes.

To alleviate the bias imposed from a long-tailed dataset, learned classifiers need to generalize for tail classes while simultaneously maintaining a good performance on head classes. Recent efforts that aim to learn from long-tailed datasets modify the training loss functions, over- or under-sample a dataset to balance it, or hallucinate or generate additional training instances (e.g., images or features). Despite the progress of these efforts, the performance of visual recognition systems still falls short when trained using long-tailed datasets.

There are two reasons that make these systems struggle on these long-tailed datasets. First, the information from the gradients of tail-class samples gets diminished given the prevalence of the head-class instances in the mini-batch. Second, more frequent sampling of instances from the tail classes reduces their training error but does not help the classifier to generalize.

Recent advances on generative approaches (e.g., GANs and autoencoders) enable the development of data augmentation techniques that make the generation of additional training samples for tail classes on the fly useful to address dataset imbalance. Although these generative approaches can hallucinate realistic imagery, they incur adaptations that are computationally expensive. Specifically, adding these generative approaches into a per-batch data augmentation policy requires training an additional neural network and adapting its sophisticated training procedures. This adds significant overhead in terms of training time, computational complexity, and use of computational resources on top of training the CNN-based image classifier.

To circumvent the cumbersome requirements of adopting a generative approach in long-tail recognition, the disclosed embodiments provide an efficient solution for Balancing Long-Tailed datasets (BLT) which utilizes gradient ascent-based adversarial image hallucination. This approach removes the requirement of using an additional network to generate images for tail classes (e.g., GANs or autoencoders). As a result, BLT alleviates the need for extensive training procedures for the generator, thus keeping the computational complexity and resources low. Instead of perturbing images to purely confuse a CNN-based image classifier, as it is done for increasing robustness of a CNN, BLT perturbs tail-class images in a batch to make them hard examples, adds them to the batch, and proceeds with the regular training procedure. BLT generates hard examples by computing image perturbations that make the classifier confuse an image from a tail class with a confusing class based on the confusion matrix.

Figure 2:
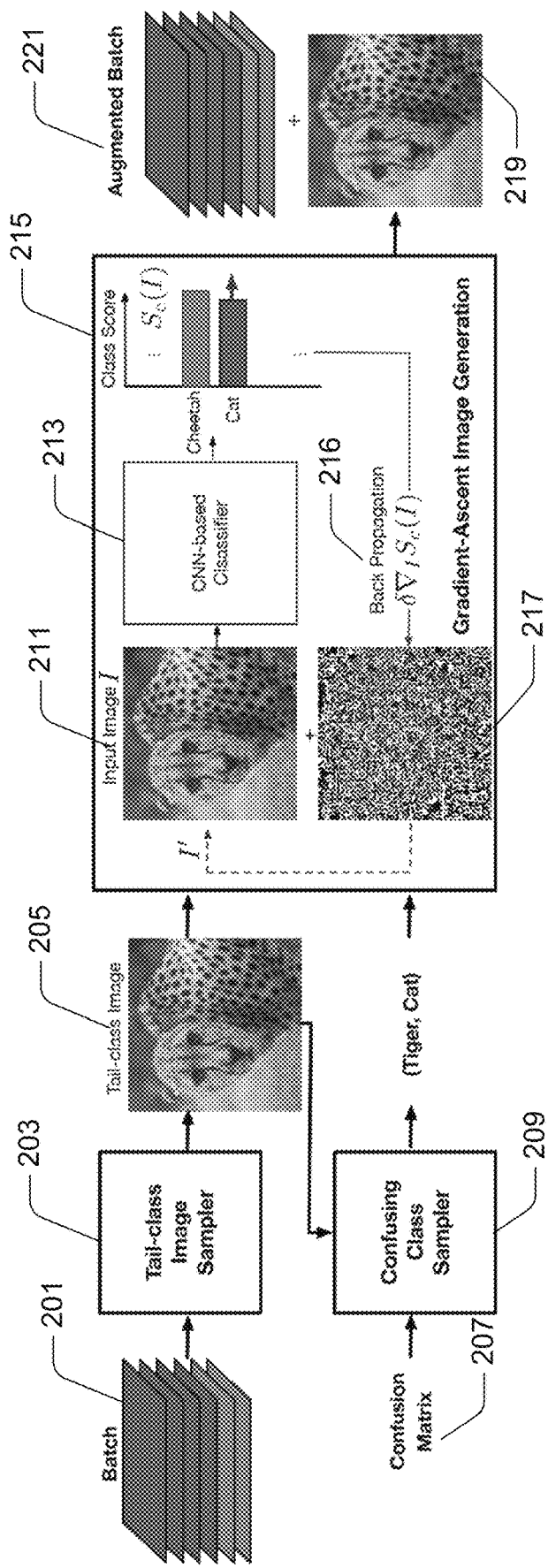
FIG. 2 is a diagram illustrating the disclosed techniques according to one embodiment disclosed herein.

FIG. 2 illustrates an overview of an embodiment disclosed herein. The simplest techniques that deal with long-tailed datasets use random sampling to artificially create a more balanced training set. The two most common techniques are oversampling and undersampling. Oversampling selects training instances from tail classes more often. On the other hand, undersampling selects instances from head classes less frequently. In practice, oversampling tail classes tends to alleviate the bias from long-tailed datasets.

While current approaches alleviate the imbalance in a long-tailed dataset, they require training additional networks besides the CNN-based classifier. While current approaches can generate realistic imagery, they can require a significant amount of effort to make them work as desired.

The present disclosure includes the principle that images do not need to look realistic in order to compensate the lack of data of tail classes. Given this argument, the disclosed embodiments provide for efficient image generation via adversarial perturbations. The goal of adversarial images is to fool CNNs or increase the robustness of a CNN-based classifier. While some techniques use GANs for generating adversarial images, there exist others that construct adversarial images by means of gradient ascent or by solving simple optimization problems. A gradient ascent-based method is utilized that computes the gradient of the posterior probability for a specific class with respect to an input image using back propagation. The method uses these gradients to compute an additive perturbation yielding a new image.

Unlike current methods, BLT does not require dedicated architectures for image generations (e.g., GANs or VAEs) and complex training procedures which can take days to train. Instead, BLT uses the underlying trained CNN-based model combined with a gradient ascent method to generate adversarial examples from tail-class images that are added to a batch. An objective of BLT is to augment a batch by generating new images from existing ones in order to compensate for the lack of training data in tail classes. With the constraint of not increasing the computational overhead considerably, the use of adversarial image perturbations is used to generate novel images. Although these techniques can create noise-induced imagery, they are effective in compensating the imbalance in a long-tailed dataset and efficient to generate.

Generating an image via gradient ascent requires evolving an image by applying a sequence of additive image perturbations. Confusing a classifier requires maximizing the posterior probability or logit of a non-true class given an input image I. Mathematically, this confusion can be posed as follows:

$$I^* = \mathrm{argmax}_I S_c(I)$$

where $S_c(I)$ is the score (e.g., logit) of class c given I.

To confuse a classifier, the goal is to maximize the score $S_c(I)$ for a non-true class c. To generate image I*, the technique first computes the gradient of the scoring function $$\nabla_I S_c(I)$$

corresponding to a non-true class c w.r.t. to an input image I using backpropagation. Then, the technique adds a scaled gradient to the input image I, i.e., $$I + \delta \nabla_I S_c(I)$$

to produce a new image I. This technique repeats this process until the score $S_c(I)$ for a non-true class is large enough to confuse a classifier. Unlike generative approaches (e.g., GANs or VQ-VAEs) that require an additional architecture to generate images (e.g., encoder-decoder networks), specialized losses, and sophisticated training procedures, this technique evolves the image I using the underlying neural network and keeps its parameters frozen. Thus, BLT saves memory because it avoids the parameters of a generative model and uses efficient implementations of backpropagation from deep learning libraries to compute the image perturbations. Further, BLT is more efficient than GANs.

As shown in FIG. 2, BLT samples a tail-class image I 205 from the batch 201 and its confusion matrix 207 from the latest validation epoch. Then, the disclosed algorithm passes I through the CNN 213 and evaluates its class scores $S_c(I)$ 215. Via back-propagation 216, the disclosed method computes the image perturbation that increases the class score of a selected confusing class (e.g., cat) and adds the perturbation to the original image to produce I' 217. The perturbed image becomes the new input, i.e., I←I'. The technique iterates until the class score of a target non-true class reaches certain threshold or an iteration limit. Finally, BLT augments the input batch 221 with the generated image 219 to resume the regular training procedure.

An objective of BLT is to generate images from tail classes using gradient ascent techniques to compensate for the imbalance in a long-tailed dataset. As a data augmentation technique, BLT generates new images from existing tail-class images in a batch. These additional images are generated in such a way that they become hard examples (i.e., confusing examples for tail classes). To this end, BLT uses the results of a validation process to detect the most confusing classes for tail classes. Then, it perturbs the images in the batch belonging to tail classes in such a way that the resultant images achieve a higher confusing class score. Subsequently, BLT appends the hard examples to the batch preserving their original tail-class labels and resumes the normal training procedure.

---

Algorithm 1: BLT

---

Input : Batch $B$, list of tail classes $\tau$, fraction p of tail classes to process,
and confusion matrix C from the latest validation epoch
Output: Augmented Batch $B'$ 1    $B' \leftarrow B$ // Initialize the output batch.
2    // Identify the tail classes present in the original batch.
3    $l \leftarrow$ IdentifyTailClasses ($B$, $\tau$)
4    // Calculate the number of the tail classes to process.
5    $n_\tau \leftarrow \lceil p \times \mathrm{Length}(l) \rceil$
6    for i ← 0 to $n_\tau$ do
7      | // For the i-th tail class c, sample an image I of class c in the training set.
8      | (I, c) ← l [i]
9      | // Select a confusing class c' for the i-th tail class c.
10    | c' ← SelectConfusingClass (C, c)
11    | // Sample a class score for $S_{c'}(\cdot)$.
12    | $s_{c'} \leftarrow$ SampleClassScore ( )

-continued

Algorithm 1: BLT

```
13  |  // Generate an adversarial image via iterative gradient ascent; see Sec. 3.1.
14  |  I' ← HallucinateImage (I, c', s_c')
15  |  // Augment batch witht the generated hard example.
16  |  ʙ + = (I', c)
17  end
18  return ʙ'
```

Algorithm 1 summarizes BLT. Given a batch B, a list of tail classes T, the fraction p of tail-class samples to process, and the confusion matrix from the latest validation epoch C, BLT first initializes the augmented batch B' by copying the original input batch B. Then, it iterates the training samples in the batch B and creates a list 1 which contains the identified tail-class samples (step 3). Next, BLT computes the number $n_T$ of tail samples to process using the fraction p where $0 \leq p \leq 1$ in step 5. Then in steps 6-17, for each tail-class sample (I, c)∈ I, BLT selects a confusing class c' for the tail class c from the confusion matrix C (step 10). Then, in step 12 BLT computes a minimum class score $s_{c'}$. Next, in step 14, BLT triggers the generation of a new image via the gradient ascent technique with a starting image I, target class c', and class score threshold sc'≥Sc'(I'). Lastly, BLT appends the new hard example (I', c) to the augmented batch B' (step 16) and returns it in step 18. When the input batch B does not contain any tail classes, then we return the input batch, i.e., B'=B.

The disclosed implementation of BLT selects a confusing class in step 4 by using information from the confusion matrix C for a given tail class c. Specifically, BLT computes a probability distribution over all classes using the confusion matrix scores for a tail class c. Then, it uses the computed distribution to sample for a confusing class c'. This strategy will select the most confusing classes more often. Subsequently, BLT computes the minimum class score $s_e$, by randomly choosing a confidence value from within 0.15 and 0.25. The disclosed implementation runs the gradient ascent image generation procedure with a learning rate 8=0.7. It stops running when $S_{c'}(I') \geq s_{c'}$ or when it reaches 15 iterations. BLT freezes the weights of the underlying network, since the goal is to generate new images.

FIG. 2 illustrates an example of how BLT operates. BLT is independent of model architecture. Since BLT operates on a batch B, it is possible that the batch contains many tail-class samples triggering BLT more often. When this occurs, the performance of the head classes may decrease. To mitigate this issue, the balancer needs to reduce the sampling frequency for tail classes. In an embodiment, a procedure is described to achieve this for the widely adopted balancer: oversampling via class weights.

The simplest balancer uses class weights $w_i \geq 0$ to define its sampling policy using the inverse frequency, i.e., $$w_i = n_i^{-1} \cdot \sum_i^N n_i$$

where $n_i$ is the number of training samples for the i-th class. This balancer then normalizes the weights to compute a probability distribution over the N classes, and uses this distribution as a sampling policy. This balancer samples tail classes more frequently because their corresponding weights $w_i$ tend to be higher. To reduce these weights of tail-classes, the following adaptation may be used $$w_i = \frac{\sum_i^N n_i}{n_i^\gamma}$$

where $\gamma$ is the exponent that inflates or deflates the weights $w_i$. When $0<\gamma<1$, the proposed balancer samples head-class instances more frequently than the inverse-frequency balancer. On the other hand, when $\gamma>1$, the balancer favors tail classes more frequently than the inverse-frequency balancer. This adaptation may maintain the performance of head-classes while significantly increasing the performance of tail classes.

In an embodiment, an adapted cosine classifier combined with the Large-Margin Softmax Loss may be used. This is because it is a strict loss and forces a classifier to find a decision boundary with a desired margin. Two parameters may allow the balancing of the accuracy drop of head classes and the accuracy gain of tail classes. The adapted squashing-cosine classifier computes the following class scores or logits for class c as follows:

$$\text{logit}_c(x) = \left(\frac{\alpha \cdot \|x\|}{\beta + \|x\|}\right) \frac{w_c^T x}{\|w_c\|\|x\|}$$

where $x \in R^d$ is the feature vector of an image I, $w_c \in R^d$ is the weight vector for class c, $\alpha$ is a scale parameter, and $\beta$ controls the squashing factor.

BLT can be seen as a learning process that uses bi-level optimization and regularization terms for tail classes at every batch. This is because the added images to the batch come from a gradient ascent procedure. Since the images in a batch go through the training loss and procedure, they consequently contribute gradients for the learning process.

BLT can be seen as the following per-batch problem:

$$\underset{\theta}{\text{minimize}} \; \frac{1}{|\mathcal{B}|} \sum_{(I_i, c_i) \in \mathcal{B}} \mathcal{H}(f_\theta(I_i), c_i) + \lambda [\![ c_i \in \mathcal{T} ]\!] \mathcal{H}(f_\theta(I'_{c'_i}), c_i)$$

$$\text{subject to } I'_{c'_i} = \underset{I}{\text{argmax}} f_\theta(I_i), \; s_{c'_i} \geq f_\theta(I_i); \; \forall \, c_i \in \mathcal{T},$$

where $f_\theta(\cdot)$ is the CNN-based classifier with parameters $\theta$; $H(\cdot)$ is a classification loss (e.g., the Large-Margin Softmax loss or binary cross entropy loss); ⟦ ⟧ is the Iverson bracket; ci is the class of $I_i$; $c_i'$ is the class to confuse the classifier using gradient ascent techniques; and $\lambda$ is the penalizing factor for mistakes on the generated images. The disclosed implementation uses $\lambda=1$.

BLT adapts its learning process at every batch. This is because in a stochastic gradient descent learning process, the parameters $\theta$ of the CNN-based classifier change at every batch. Due to this bi-level optimization and regularization, BLT generates images for tail classes that compensate the long-tailed dataset and forces the CNN-based classifier to generalize well on few-shot classes.

Figure 3:
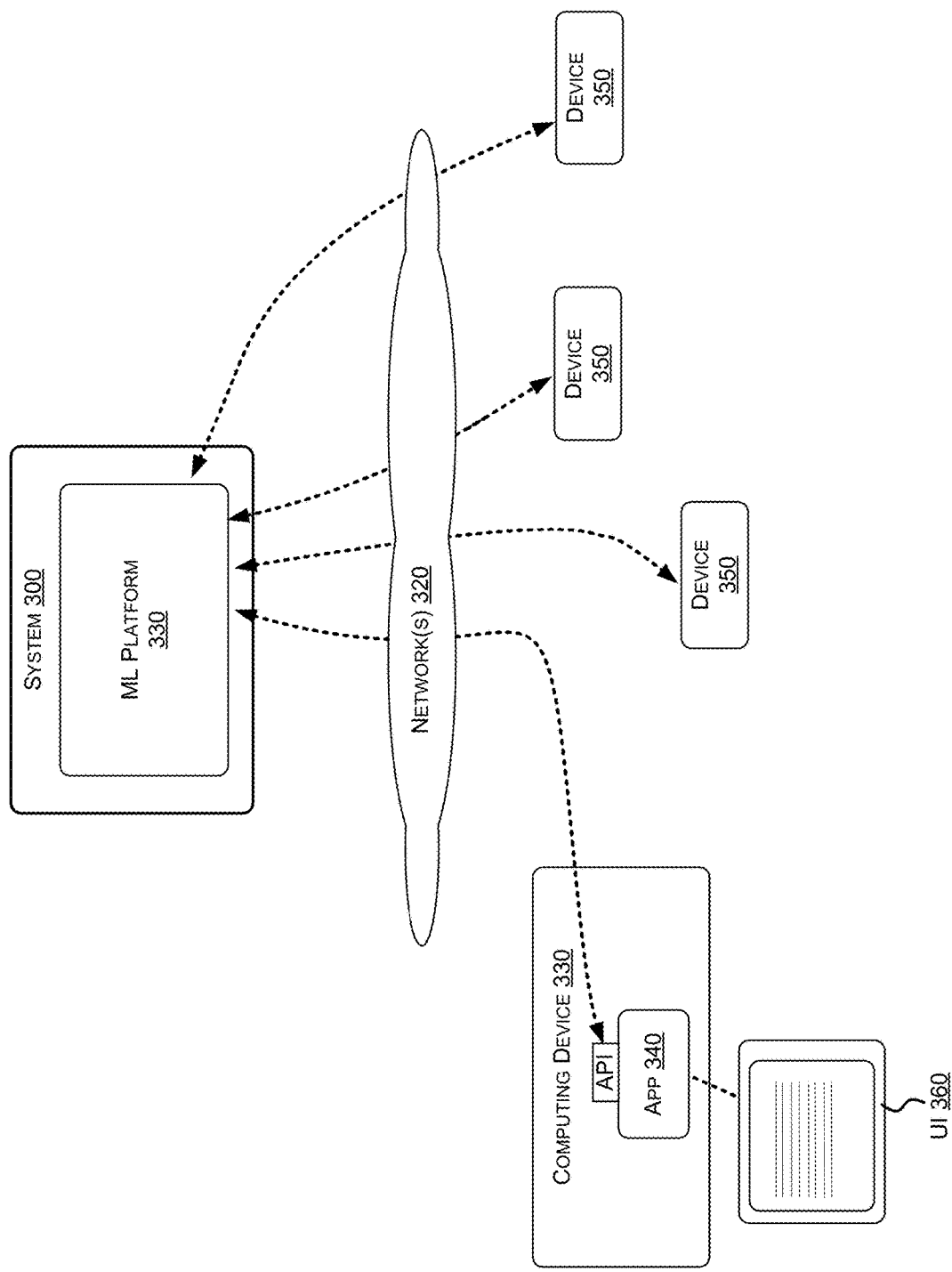
FIG. 3 is a diagram showing aspects of an example system according to one embodiment disclosed herein.

In the example system illustrated in FIG. 3, a system 300 is illustrated that implements machine learning (ML) platform 330. The ML platform 330 may be configured to provide output data to various devices 350 over a network 320, as well as computing device 330. A user interface 360 may be rendered on computing device 330. The user interface 360 may be provided in conjunction with an application 340 that communicates to the ML platform 330 using an API via network 320. In some embodiments, system 300 may be configured to provide product information to users. In one example, ML platform 330 may implement a machine learning system to perform one or more tasks. The ML platform 330 utilize the machine learning system to perform tasks such as image and writing recognition. The machine learning system may be configured to be optimized using the techniques described herein.

Figure 4:
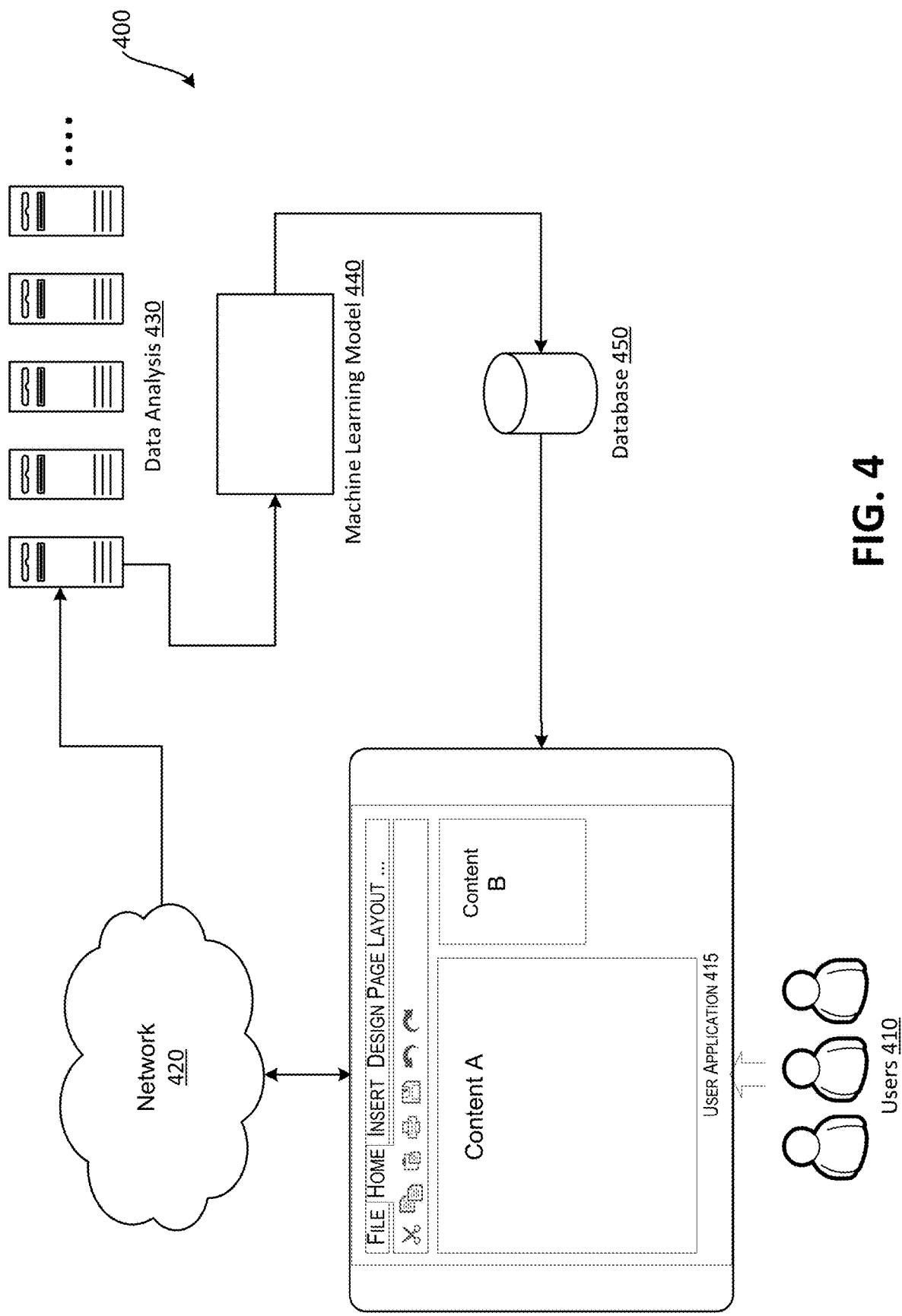
FIG. 4 is a diagram showing aspects of an example system according to one embodiment disclosed herein.

FIG. 4 is a computing system architecture diagram showing an overview of a system disclosed herein for implementing a machine learning model, according to one embodiment disclosed herein. As shown in FIG. 4, a machine learning system 400 may be configured to perform analysis and perform identification, prediction, or other functions based upon various data collected by and processed by data analysis components 430 (which might be referred to individually as an "data analysis component 430" or collectively as the "data analysis components 430"). The data analysis components 430 may, for example, include, but are not limited to, physical computing devices such as server computers or other types of hosts, associated hardware components (e.g. memory and mass storage devices), and networking components (e.g. routers, switches, and cables). The data analysis components 430 can also include software, such as operating systems, applications, and containers, network services, virtual components, such as virtual disks, virtual networks, and virtual machines. The database 450 can include data, such as a database, or a database shard (i.e. a partition of a database). Feedback may be used to further update various parameters that are used by machine learning model 420. Data may be provided to the user application 415 to provide results to various users 410 using a user application 415. In some configurations, machine learning model 420 may be configured to utilize supervised and/or unsupervised machine learning technologies. A model compression framework based on sparsity-inducing regularization optimization as disclosed herein can reduce the amount of data that needs to be processed in such systems and applications. Effective model compression when processing iterations over large amounts of data may provide improved latencies for a number of applications that use such technologies, such as image and sound recognition, recommendation systems, and image analysis.

Figure 5:
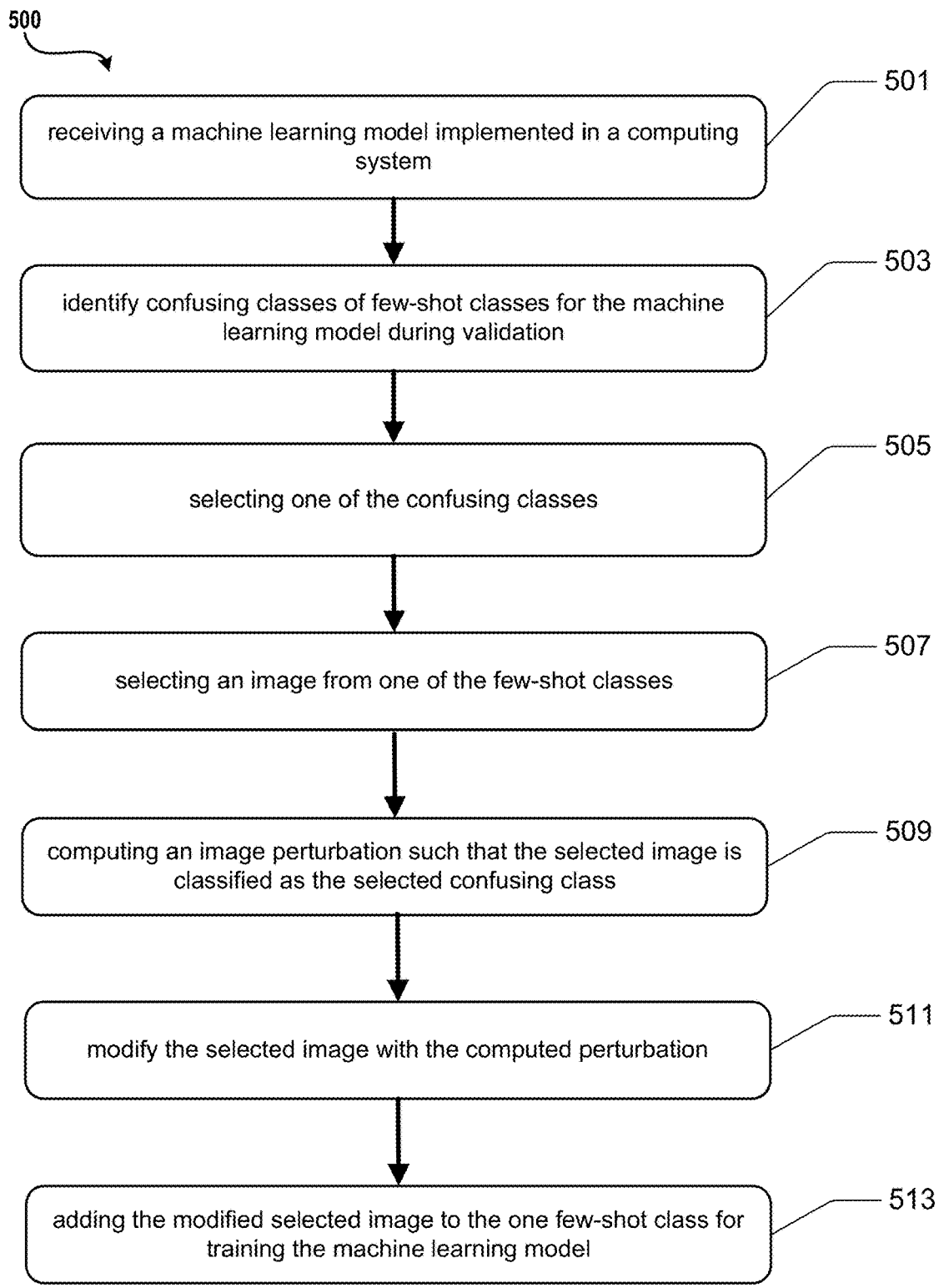
FIG. 5 is a flow diagram showing aspects of an illustrative routine, according to one embodiment disclosed herein.

Turning now to FIG. 5, illustrated is an example operational procedure for balancing a dataset for a machine learning model in accordance with the present disclosure. The operational procedure may be implemented in a system comprising one or more computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 5, operation 501 illustrates receiving a machine learning model implemented in a computing system.

Operation 501 may be followed by operation 503. Operation 503 illustrates identify confusing classes of few-shot classes for the machine learning model during validation.

Operation 503 may be followed by operation 505. Operation 505 illustrates selecting one of the confusing classes.

Operation 505 may be followed by operation 507. Operation 507 illustrates selecting an image from one of the few-shot classes.

Operation 507 may be followed by operation 509. Operation 509 illustrates computing an image perturbation such that the selected image is classified as the selected confusing class.

Operation 509 may be followed by operation 511. Operation 511 illustrates modifying the selected image with the computed perturbation.

Operation 511 may be followed by operation 513. Operation 513 illustrates adding the modified selected image to the one few-shot class for training the machine learning model.

Figure 6:
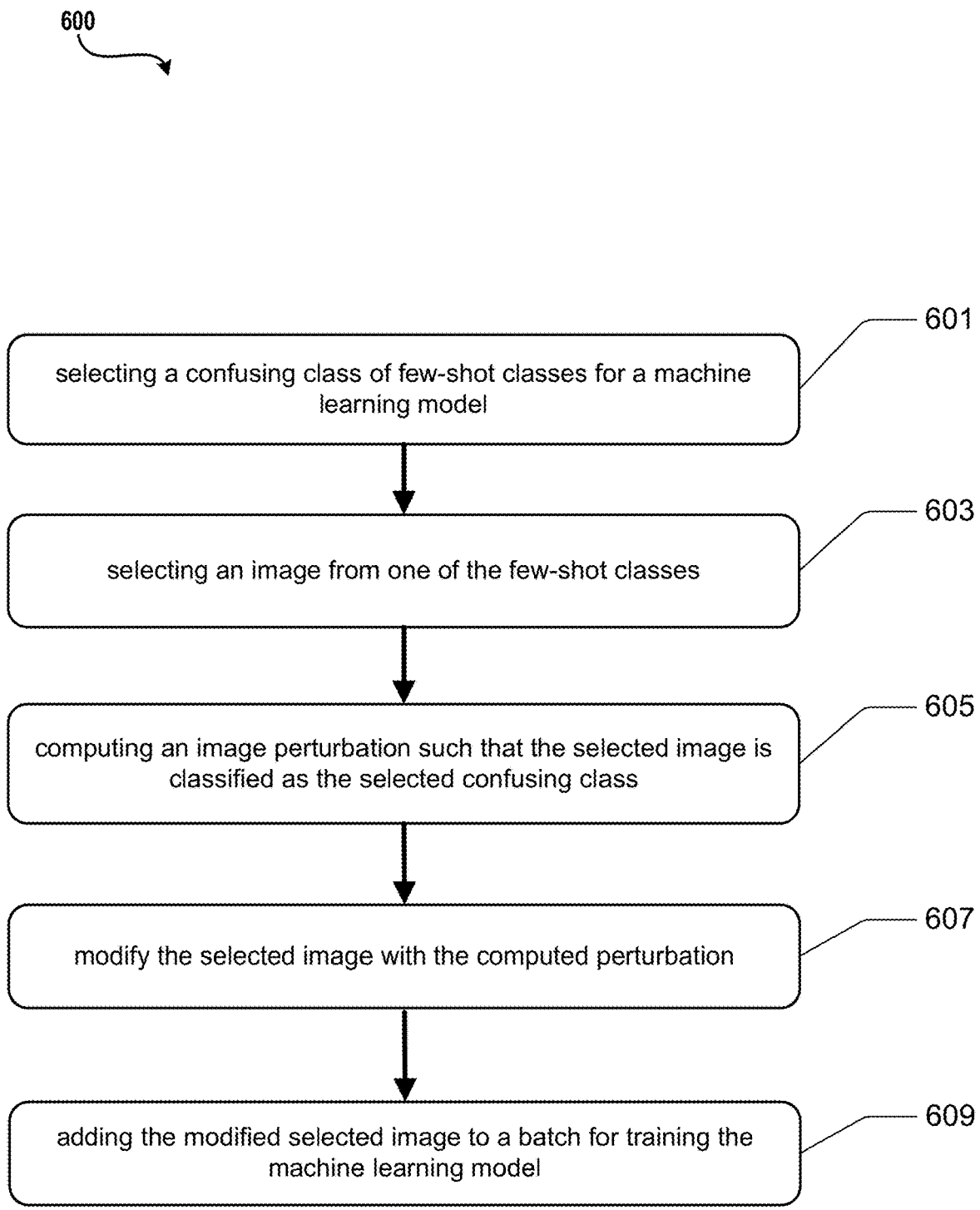
FIG. 6 is a flow diagram showing aspects of an illustrative routine, according to one embodiment disclosed herein.

Referring to FIG. 6, operation 601 illustrates selecting a confusing class of few-shot classes for a machine learning model.

Operation 601 may be followed by operation 603. Operation 603 illustrates selecting an image from one of the few-shot classes.

Operation 603 may be followed by operation 605. Operation 605 illustrates computing an image perturbation such that the selected image is classified as the selected confusing class.

Operation 605 may be followed by operation 607. Operation 607 illustrates modifying the selected image with the computed perturbation.

Operation 607 may be followed by operation 609. Operation 609 illustrates adding the modified selected image to a batch for training the machine learning model.

Figure 7:
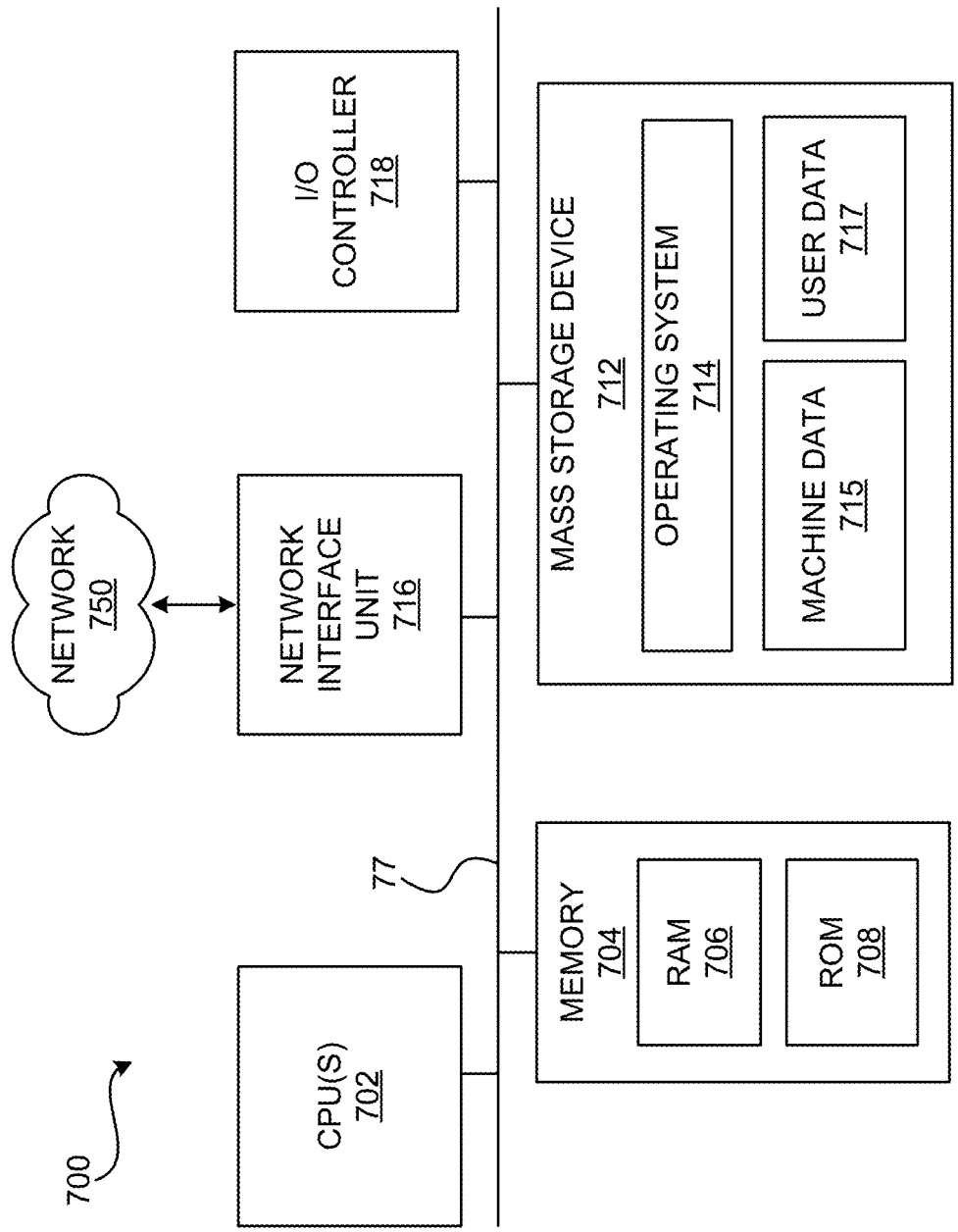
FIG. 7 is a computer architecture diagram illustrating aspects of an example computer architecture for a computer capable of executing the software components described herein.

FIG. 7 shows an example computer architecture for a computer capable of providing the functionality described herein such as, for example, a computing device configured to implement the functionality described above with reference to FIGS. 1-6. Thus, the computer architecture 700 illustrated in FIG. 7 illustrates an architecture for a server computer or another type of computing device suitable for implementing the functionality described herein. The computer architecture 700 might be utilized to execute the various software components presented herein to implement the disclosed technologies.

The computer architecture 700 illustrated in FIG. 7 includes a central processing unit 702 ("CPU"), a system memory 704, including a random-access memory 706 ("RAM") and a read-only memory ("ROM") 708, and a system bus 77 that couples the memory 704 to the CPU 702. A firmware containing basic routines that help to transfer information between elements within the computer architecture 700, such as during startup, is stored in the ROM 708. The computer architecture 700 further includes a mass storage device 712 for storing an operating system 714, other data, such as product data 715 or user data 717.

The mass storage device 712 is connected to the CPU 702 through a mass storage controller (not shown) connected to the bus 77. The mass storage device 712 and its associated computer-readable media provide non-volatile storage for the computer architecture 700. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various implementations, the computer architecture 700 might operate in a networked environment using logical connections to remote computers through a network 750 and/or another network (not shown). A computing device implementing the computer architecture 700 might connect to the network 750 through a network interface unit 716 connected to the bus 77. It should be appreciated that the network interface unit 716 might also be utilized to connect to other types of networks and remote computer systems.

The computer architecture 700 might also include an input/output controller 718 for receiving and processing input from a number of other devices, including a keyboard, mouse, or electronic stylus (not shown in FIG. 7). Similarly, the input/output controller 718 might provide output to a display screen, a printer, or other type of output device (also not shown in FIG. 7).

It should be appreciated that the software components described herein might, when loaded into the CPU 702 and executed, transform the CPU 702 and the overall computer architecture 700 from a general-purpose computing system into a special-purpose computing system customized to facilitate the functionality presented herein. The CPU 702 might be constructed from any number of transistors or other discrete circuit elements, which might individually or collectively assume any number of states. More specifically, the CPU 702 might operate as a finite-state machine, in response to executable instructions contained within the software modules disclosed herein. These computer-executable instructions might transform the CPU 702 by specifying how the CPU 702 transitions between states, thereby transforming the transistors or other discrete hardware elements constituting the CPU 702.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 might include other types of computing devices, including hand-held computers, embedded computer systems, personal digital assistants, and other types of computing devices known to those skilled in the art.

It is also contemplated that the computer architecture 700 might not include all of the components shown in FIG. 7, might include other components that are not explicitly shown in FIG. 7, or might utilize an architecture completely different than that shown in FIG. 7. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 8:
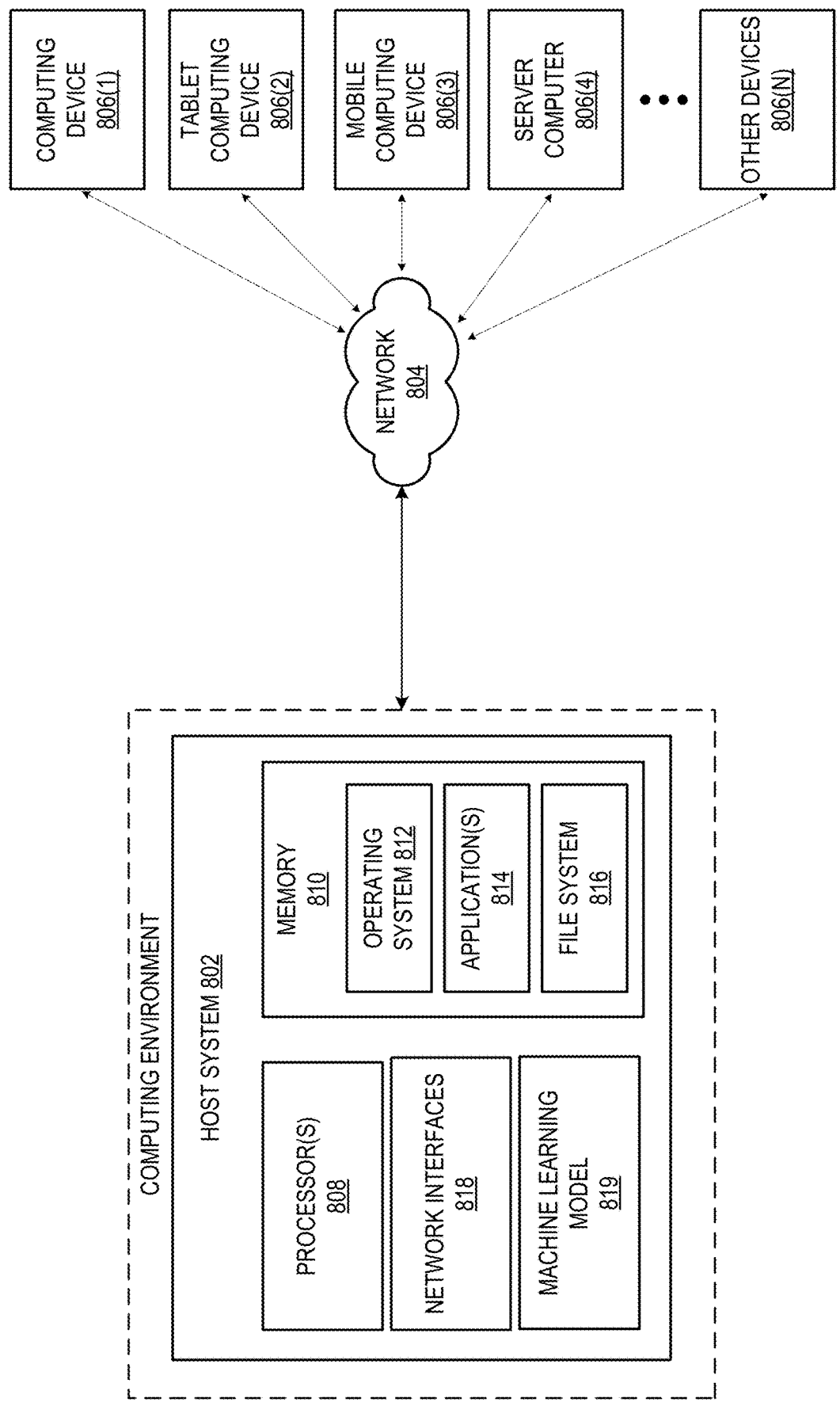
FIG. 8 is a data architecture diagram showing an illustrative example of a computer environment.

FIG. 8 illustrates an example computing environment capable of executing the techniques and processes described above with respect to FIGS. 1-7. In various examples, the computing environment comprises a host system 802. In various examples, the host system 802 operates on, in communication with, or as part of a network 804.

The network 804 can be or can include various access networks. For example, one or more client devices 806(1) . . . 806(N) can communicate with the host system 802 via the network 804 and/or other connections. The host system 802 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 802 can be provided by one or more servers that are executing as part of, or in communication with, the network 804. A server can host various services, virtual machines, portals, and/or other resources. For example, a can host or provide access to one or more portals, Web sites, and/or other information.

The host system 802 can include processor(s) 808 memory 810. The memory 810 can comprise an operating system 812, application(s) 814, and/or a file system 816. Moreover, the memory 810 can comprise the storage unit(s) 82 described above with respect to FIGS. 1-5.

The processor(s) 808 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions.

Among other capabilities, the processor(s) may be configured to fetch and execute computer-readable instructions stored in the memory 810.

The memory 810 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 802 can communicate over the network 804 via network interfaces 818. The network interfaces 818 can include various types of network hardware and software for supporting communications between two or more devices. The host system 802 may also include machine learning model 819.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method of balancing a dataset for a machine learning model, the method comprising:
receiving a machine learning model implemented in a computing system;
identify confusing classes of few-shot classes for the machine learning model during validation;
selecting one of the confusing classes;
selecting an image from one of the few-shot classes;
computing an image perturbation such that the selected image is classified as the selected confusing class;
modifying the selected image with the computed perturbation; and
adding the modified selected image to the one few-shot class for training the machine learning model.

Clause 2: The method of clause 1, wherein the image perturbation is computed using a gradient-ascent technique that propagates a gradient to an input image.

Clause 3: The method of any of clauses 1-2, wherein the image perturbation is computed using a gradient-ascent technique that propagates a gradient to an input image.

Clause 4: The method of any of clauses 1-3, wherein the selected image is modified by maximizing a posterior probability or logit of a non-true class given an input image.

Clause 5: The method of any of clauses 1-4, wherein the one confusing class is selected by:
computing a probability distribution over all classes using confusion matrix scores for a tail class;
and using the computed probability distribution to sample for a confusing class.
Clause 6: The method of any of clauses 1-5, wherein a minimum class score is computed by randomly choosing a confidence value from within 0.15 and 0.25.
Clause 7: The method of clauses 1-6, wherein the gradient-ascent technique is executed with a learning rate δ=0.7.
Clause 8: The method of any of clauses 1-7, further comprising stopping the gradient-ascent technique when $S_{c'}(I') \geq s_{c'}$ or when 15 iterations is reached.
Clause 9: A system comprising:
one or more processors; and
a memory in communication with the one or more processors, the memory having computer-readable instructions stored thereupon that, when executed by the one or more processors, cause the system to perform operations comprising:
selecting a confusing class of few-shot classes for a machine learning model;
selecting an image from one of the few-shot classes;
computing an image perturbation such that the selected image is classified as the selected confusing class;
modifying the selected image with the computed perturbation; and
adding the modified selected image to a batch for training the machine learning model.
Clause 10: The system of clause 9, wherein the image perturbation is computed using a gradient-ascent technique that propagates a gradient to an input image.
Clause 11: The system of any of clauses 9 and 10, further comprising computing a pixel update based on the gradient.
Clause 12: The system of any clauses 9-11, wherein the selected image is modified by maximizing a posterior probability or logit of a non-true class given an input image.
Clause 13: The system of any clauses 9-12, wherein the one confusing class is selected by:
computing a probability distribution over all classes using confusion matrix scores for a tail class;
and using the computed probability distribution to sample for a confusing class.
Clause 14: A computer-readable storage medium having computer-executable instructions stored thereupon which, when executed by one or more processors of a computing device, cause the computing device to perform operations comprising:
receiving a machine learning model implemented in a computing system;
identify confusing classes of few-shot classes for the machine learning model during validation;
selecting one of the confusing classes;
selecting an image from one of the few-shot classes;
computing an image perturbation such that the selected image is classified as the selected confusing class;
modify the selected image with the computed perturbation; and
adding the modified selected image to a batch for training the machine learning model.

Clause 15: The computer-readable storage medium of clause 14, wherein a minimum class score is computed by randomly choosing a confidence value from within 0.15 and 0.25.
Clause 16: The computer-readable storage medium of any of clauses 14 and 15, wherein:
the image perturbation is computed using a gradient-ascent technique that propagates a gradient to an input image; and
the gradient-ascent technique is executed with a learning rate δ=0.7.
Clause 17: The computer-readable storage medium of any of the clauses 14-16, further comprising stopping the gradient-ascent technique when $S_{c'}(I') \geq s_{c'}$ or when 15 iterations is reached.
Clause 18: The computer-readable storage medium of any of the clauses 14-17, wherein the image perturbation is computed using a gradient-ascent technique that propagates a gradient to an input image.
Clause 19: The computer-readable storage medium of any of the clauses 14-18, further comprising computing a pixel update based on the gradient.
Clause 20: The computer-readable storage medium of any of the clauses 14-19, wherein the selected image is modified by maximizing a posterior probability or logit of a non-true class given an input image.

What is claimed is:
1. A method of balancing a dataset for a machine learning model, the method comprising:
   accessing a machine learning model implemented in a computing system;
   identifying confusing classes of few-shot classes for the machine learning model during validation;
   selecting one of the confusing classes;
   selecting an image from one of the few-shot classes;
   computing an image perturbation such that the selected image is classified as the selected confusing class, wherein the image perturbation is computed by applying a sequence of additive image perturbations;
   modifying the selected image with the computed perturbation; and
   adding the modified selected image to the one few-shot class for training the machine learning model.
2. The method of claim 1, wherein the image perturbation is computed using a gradient-ascent technique that propagates a gradient to an input image.
3. The method of claim 2, further comprising computing a pixel update based on the gradient.
4. The method of claim 1, wherein the selected image is modified by maximizing a posterior probability or logit of a non-true class given an input image.
5. The method of claim 1, wherein the one confusing class is selected by:
   computing a probability distribution over all classes using confusion matrix scores for a tail class;
   and using the computed probability distribution to sample for a confusing class.
6. The method of claim 1, wherein a minimum class score is computed by randomly choosing a confidence value from within 0.15 and 0.25.
7. The method of claim 2, wherein the gradient-ascent technique is executed with a learning rate δ=0.7.
8. The method of claim 7, further comprising stopping the gradient-ascent technique when $S_{c'}(I') \geq S_{c'}$ or when 15 iterations is reached.

9. A computing system, comprising:
one or more processors; and
a computer-readable storage medium having computer-executable instructions stored thereupon which, when executed by the processor, cause the computing system to perform operations comprising:
selecting a confusing class of few-shot classes for a machine learning model;
selecting an image from one of the few-shot classes;
computing an image perturbation such that the selected image is classified as the selected confusing class, wherein the image perturbation is computed using a gradient-ascent technique that propagates a gradient to an input image;
modifying the selected image with the computed perturbation; and
adding the modified selected image to a batch for training the machine learning model.

10. The computing system of claim 9, wherein the image perturbation is computed using a gradient-ascent technique that propagates a gradient to an input image.

11. The computing system of claim 10, further comprising computing a pixel update based on the gradient.

12. The computing system of claim 9, wherein the selected image is modified by maximizing a posterior probability or logit of a non-true class given an input image.

13. The computing system of claim 9, wherein the one confusing class is selected by:
computing a probability distribution over all classes using confusion matrix scores for a tail class;
and using the computed probability distribution to sample for a confusing class.

14. A computer-readable storage medium having computer-executable instructions stored thereupon which, when executed by one or more processors of a computing device, cause the computing device to perform operations comprising:
accessing a machine learning model implemented in a computing system;
identifying confusing classes of few-shot classes for the machine learning model during validation;
selecting one of the confusing classes;
selecting an image from one of the few-shot classes;
computing an image perturbation such that the selected image is classified as the selected confusing class, wherein the image perturbation is computed by applying a sequence of additive image perturbations;
modify the selected image with the computed perturbation; and
adding the modified selected image to a batch for training the machine learning model.

15. The computer-readable storage medium of claim 14, wherein a minimum class score is computed by randomly choosing a confidence value from within 0.15 and 0.25.

16. The computer-readable storage medium of claim 15, wherein the image perturbation is computed using a gradient-ascent technique that propagates a gradient to an input image.

17. The computer-readable storage medium of claim 16, wherein:
the gradient-ascent technique is executed with a learning rate $\delta=0.7$.

18. The computer-readable storage medium of claim 16, further comprising stopping the gradient-ascent technique when $S_c(I') \geq S_{c'}$ or when 15 iterations is reached.

19. The computer-readable storage medium of claim 16, further comprising computing a pixel update based on the gradient.

20. The computer-readable storage medium of claim 14, wherein the selected image is modified by maximizing a posterior probability or logit of a non-true class given an input image.

* * * * *